United States Patent
Marcenac (10) Patent No.: US 10,771,179 B1
(45) Date of Patent: Sep. 8, 2020

(54) WAVELENGTH ROUTED NETWORKS WITH IMPROVED NETWORK UTILIZATION

(71) Applicant: Amazon Technologies, Inc., Seattle, WA (US)

(72) Inventor: Dominique Marcenac, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/969,529

(22) Filed: May 2, 2018

(51) Int. Cl.
| | | |
|---|---|---|
| H04J 14/00 | (2006.01) | |
| H04J 14/02 | (2006.01) | |
| H04Q 11/00 | (2006.01) | |
| H04B 10/80 | (2013.01) | |
| H04B 10/25 | (2013.01) | |

(52) U.S. Cl.
CPC .... *H04J 14/0212* (2013.01); *H04B 10/25891* (2020.05); *H04B 10/80* (2013.01); *H04Q 11/0005* (2013.01); *H04Q 2011/0016* (2013.01); *H04Q 2011/0052* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,675,676 | A * | 10/1997 | Yamashita | .......... | H04J 14/0201 385/24 |
| 6,061,157 | A * | 5/2000 | Terahara | ............. | H04J 14/0212 385/15 |
| 9,520,959 | B2 * | 12/2016 | Matsukawa | ......... | H04J 14/0204 |
| 9,813,182 | B2 * | 11/2017 | Ji | ........................... | H04J 14/021 |
| 2001/0024540 | A1 * | 9/2001 | Ibukuro | .............. | H04J 14/0283 385/17 |
| 2002/0057477 | A1 * | 5/2002 | Rocca | ................ | H04Q 11/0062 398/104 |
| 2005/0084207 | A1 * | 4/2005 | Nagel | ................. | H04J 14/0201 385/24 |
| 2009/0041457 | A1 * | 2/2009 | Maki | .................... | H04J 14/0217 398/45 |
| 2010/0290786 | A1 * | 11/2010 | Abbott | ................ | H04J 14/0205 398/79 |
| 2011/0076016 | A1 * | 3/2011 | Wisseman | .......... | H04J 14/0204 398/48 |
| 2011/0311216 | A1 * | 12/2011 | Inoue | ................... | H04J 14/0213 398/1 |
| 2012/0027408 | A1 * | 2/2012 | Atlas | ..................... | H04J 14/022 398/58 |
| 2012/0177362 | A1 * | 7/2012 | Zhang | ................ | H04B 10/0773 398/9 |

(Continued)

*Primary Examiner* — David C Payne
*Assistant Examiner* — Pranesh K Barua
(74) *Attorney, Agent, or Firm* — Klarquist Sparkman, LLP (57) ABSTRACT

An apparatus includes a node situated to receive an odd-number X of input/output communication branches extending from respective ports, each communication branch including two input/output fiber pairs, and a 2·X degree ROADM coupled to the two input/output fiber pairs of each of the X ports and configured to reduce a wavelength blocking of traffic through the node that is associated with the odd-number X. Methods of directing communication signals to and receiving communication signals from communication nodes are also disclosed.

11 Claims, 9 Drawing Sheets

(56) References Cited

U.S. PATENT DOCUMENTS

| | | | |
|---|---|---|---|
| 2012/0183292 A1* | 7/2012 | Boduch | H04J 14/0208 398/48 |
| 2012/0263476 A1* | 10/2012 | Sabet | H04L 9/3226 398/104 |
| 2012/0328239 A1* | 12/2012 | Fuerst | H04J 14/0258 385/20 |
| 2013/0058647 A1* | 3/2013 | Boertjes | H04B 10/07955 398/38 |
| 2013/0259474 A1* | 10/2013 | Ji | H04J 14/0204 398/48 |
| 2015/0289036 A1* | 10/2015 | Takeshita | H04Q 11/0005 398/48 |
| 2015/0295674 A1* | 10/2015 | Inoue | H04B 10/038 398/83 |
| 2016/0192042 A1* | 6/2016 | Mitchell | H04J 14/0212 398/48 |
| 2016/0308638 A1* | 10/2016 | Zhang | H04J 14/0205 |
| 2017/0250752 A1* | 8/2017 | Yuki | H04Q 11/0062 |
| 2018/0139005 A1* | 5/2018 | Boduch | H04Q 11/0005 |
| 2018/0219619 A1* | 8/2018 | Takigawa | H04B 10/27 |

\* cited by examiner

WAVELENGTH ROUTED NETWORKS WITH IMPROVED NETWORK UTILIZATION

BACKGROUND

Network communication can often involve transmitting substantial amounts of data across extended distances, such as across oceanic distances. Optical signals are typically directed between various nodes of an oceanic communication network with various wavelength-based traffic routing options. However, once subsea cables of the oceanic communication network are deployed 100s of meters below sea-level, it is generally undesirable or cost prohibitive to make hardware changes to submerged equipment. Subsea cables and equipment often have extended expected lifetimes, such as 25 years or longer, before cables are upgraded or equipment changed. Furthermore, global network communication traffic demands are generally unpredictable over time, requiring further emphasis on upfront network scalability and routing configurability. Thus, a need remains to provide improved network utilization in routed networks.

DETAILED DESCRIPTION

The following description is directed to technologies for improving or optimizing traffic routing of different optical wavelengths in optical fiber communication networks. Embodiments are described that use remotely configurable wavelength selective switches (WSS) in multi-degree reconfigurable optical add-drop multiplexers (ROADM) to direct individual wavelength channels of network traffic signals along different communication branches through a network node having an odd-number of used input/output ports. ROADMs are selected that have a degree that is twice the odd number of ports of the node receiving communication branches. The extra degrees of the ROADM are assigned to an additional pair of transmit/receive fibers from each communication branch to "double-up" on each communication branch. A subsea node example can include several of these even-numbered degree ROADMs so that as traffic increases, and additional input/output fiber pairs of the communication branches become activated, the additional ROADMs can also become activated and provide improved traffic utilization rates associated with the doubling-up of fiber pairs on each branch.

Wavelength routed optical fiber networks can provide flexibility to adapt to changing traffic demands by rerouting individual wavelength channels, but because a wavelength channel cannot change its wavelength without an expensive and bulky device, this can introduce blocking in the network at a node as two channels with the same wavelength typically cannot use the same fiber. At least some embodiments are particularly relevant for situations where the optical transponders used to transmit and receive the optical channels use the same wavelength in both the transmit and receive directions. It is not immediately intuitive, but any wavelength routing device with an odd number of directions extending from it will always result in sub-100% average utilization of the data communication medium, such as optical fibers, regardless of what traffic pattern is experienced by the wavelength routing device at the node. However, with an even number of directions, 100% utilization is achievable for certain traffic patterns through the wavelength routing device. Embodiments herein avoid this limitation by doubling (or selectively increasing) the number of fibers on each path into a wavelength routing device, to effectively make the number of directions even. Such improvements are especially attractive to existing subsea networks, because for the first time, submerged wavelength routing devices are starting to be used, 3-way junctions in subsea networks are common, and subsea networks have a long lifetime of around 25 years over which it is difficult to accurately predict changing traffic demands, making routing flexibility while achieving high utilization important.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many useful functional alternatives can be made, and such selections need not be better, smaller, or otherwise preferable to other selections.

As used herein, "optical signal" refers to propagating electromagnetic radiation, typically at wavelengths between about 200 nm and 2 μm. In most practical examples, signal wavelengths are between 700 nm and 1700 nm. Typically, optical signals are modulated based on data to be communicated to form time varying optical beams. In typical examples, optical signals are switched and directed through communication nodes without requiring conversion of the optical signals to electrical signals and reconversion of the electrical signals back to the optical domain. In some examples, wavelengths are at or near 1550 nm and correspond to wavelengths used in wavelength division multiplexed (WDM) communication systems or so-call dense WDM (DWDM) systems. At least some of the disclosed embodiments can also be used with coarse wavelength division multiplexing (CWDM) systems, in which case the wavelengths may be about 1310 nm. CWDM systems may be particularly useful for short-reach applications (e.g., on the order of tens or hundreds of meters, such as within a data center, or between closely situated subsea communication nodes). Signal propagation is largely confined to optical waveguides such as optical fibers, silica-on-silicon waveguides, or waveguides in GaAs, InGaAs or other materials, though free-space propagation or alternate media can be used, such as prisms or other components of wavelength selective switches. Optical signals at different wavelengths define different wavelength channels, and can be referred to herein as channels or bands. While channels are associated with a specific wavelength such as a center wavelengths, the associated optical beams also have spectral widths selected to control channel overlap. Typically, an optical beam associated with a particular wavelength can be modulated, transmitted, selected, and switched independently of other wavelengths (channels) in a multi-wavelength beam or optical signal. Furthermore, some embodiments can take advantage of the disclosed wavelength switching and node structural improvements at non-optical wavelengths, such as at microwave or radio wavelengths. In undersea examples, optical cables typically include a plurality of fibers, and more typically include pluralities of transmit/receiver fiber pairs. For convenient explanation, DWDM multiplexed signals are used for illustration.

Figure 1:
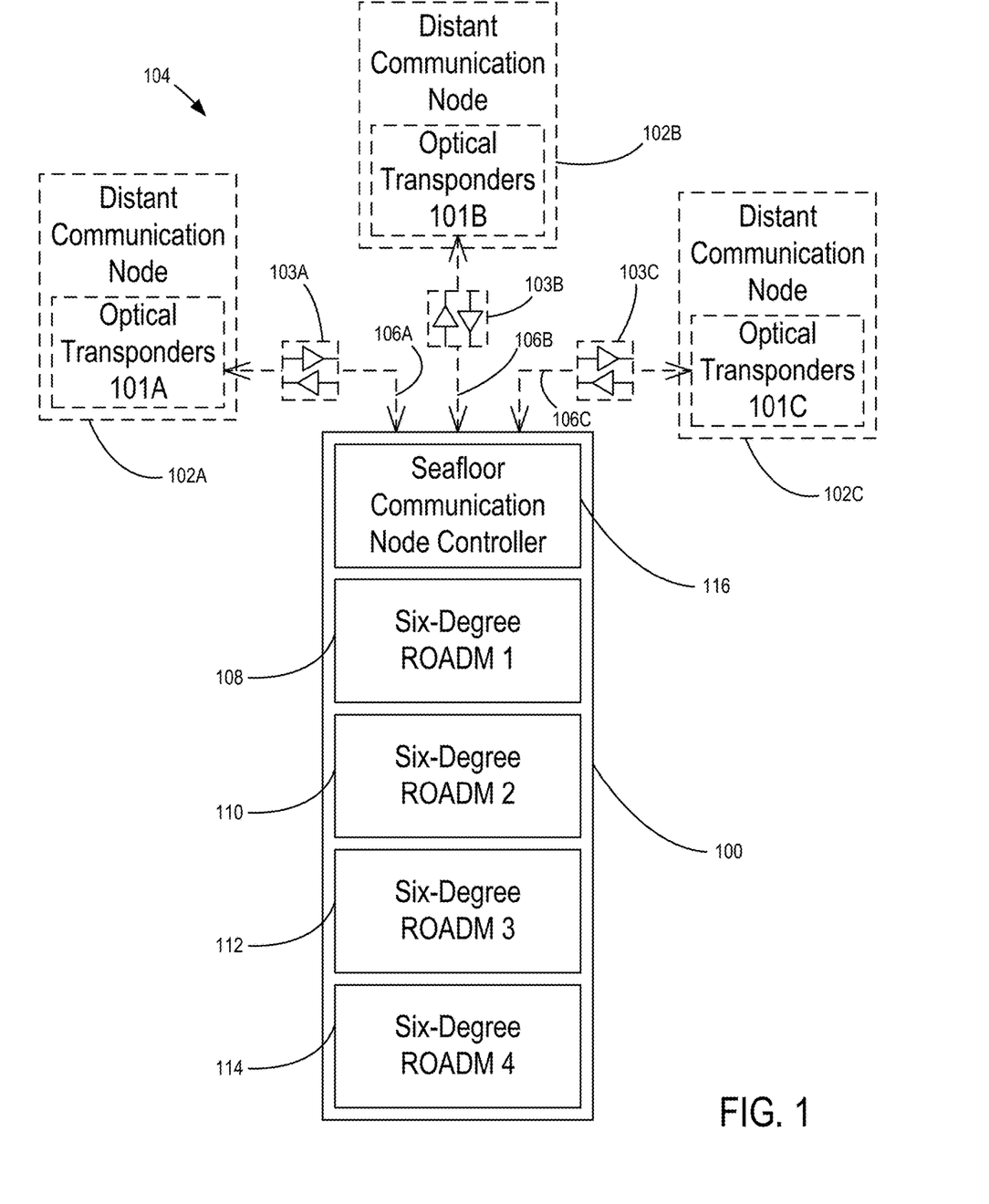
FIG. 1 illustrates a three-port communication node coupled to a larger optical communication network.

FIG. 1 is an example subsea optical communication node 100 forming a three-port node that is coupled to optical transponders 101A-101C of respective distant optical communication nodes 102A-102C of a larger optical communication network 104 via subsea optical fiber cables 106A-106C. While the node 100 includes three ports, other numbers of ports can be used provided the number is odd. In some examples, one or more of the distant communication nodes 102A-102C can also be situated subsea. The distant communication nodes 102A-102C can have different numbers of ports, e.g., two, three, four, five, six, etc. Distances can vary, and can include some branch lengths of meters or shorter, as well as kilometers or longer, with optical repeaters 103A-103C typically situated in-line to amplify propagating signals along extended communication distances, such as those spanning oceanic dimensions. In typical examples, the subsea optical fiber cables 106A-106C each includes a plurality of optical fiber pairs. Currently deployed subsea cables can include up to eight optical fiber pairs, though the number can vary and can depend upon power and/or mechanical constraints associated with the cable, in-line repeaters, or other factors associated with the optical communication network 104. The subsea optical communication node 100 is typically deployed for extended periods and configured to hold up under subsea conditions, and therefore is generally not directly accessible for maintenance, part replacement, and manual reconfigurability. Thus, in typical examples, the subsea optical communication node 100 is configured without extensive architectures and multiple interacting optical systems, such as different optical transponders, laser amplifiers, displays, etc., and is provided with power and controlling communication through one or more of the fiber cables 106A-106C. However, in some communication node examples herein, including subsea communication nodes, more extensive arrangements are possible.

In representative examples, pairs of the optical fiber pairs of each subsea optical cable 106A-106C are grouped together and coupled to separate respective six-degree ROADMs 108, 110, 112, 114 of the subsea optical communication node 100. The subsea optical communication node 100 further includes a subsea communication node controller 116 coupled to each of the ROADMs 108-112 and that is configured to control switching of different wavelengths of optical signals propagating along each fiber of the pair of fibers of the subsea optical cable 106A-106C coupled to the corresponding ROADM 108-112. During initial operation, the subsea optical communication node 100 might experience a low traffic demand such that data communication is routed only along two pairs of input/output fibers of the three subsea optical fiber cables 106A-106C via the six-degree ROADM 108. As traffic bandwidth demand through the subsea optical communication node 100 increases, another set of input/output fiber pairs coupled through the six-degree ROADM 110 (and the six-degree ROADM 110) can be remotely activated and wavelength switchably controlled with the subsea communication node controller 116 (or remotely via the distant communication nodes 102A-102C). In typical examples, the subsea communication node controller 116 is coupled through one or more of the each subsea optical cable 106A-106C to receive power and communication to provide switching power and switching commands for the ROADMs 108-112. By preconfiguring the subsea optical communication node 100 with the multiple ROADMs 108-112 with degree-levels generally equal to twice the number of communication branches of the subsea optical communication node 100, traffic utilization can be maximized for most traffic scenarios. Also, such utilization can remain optimized as bandwidth demands through the subsea optical communication node 100 increase over equipment lifetime durations so that hardware changes of submerged equipment, which may be impossible or impractical, can be avoided.

Figure 2A:
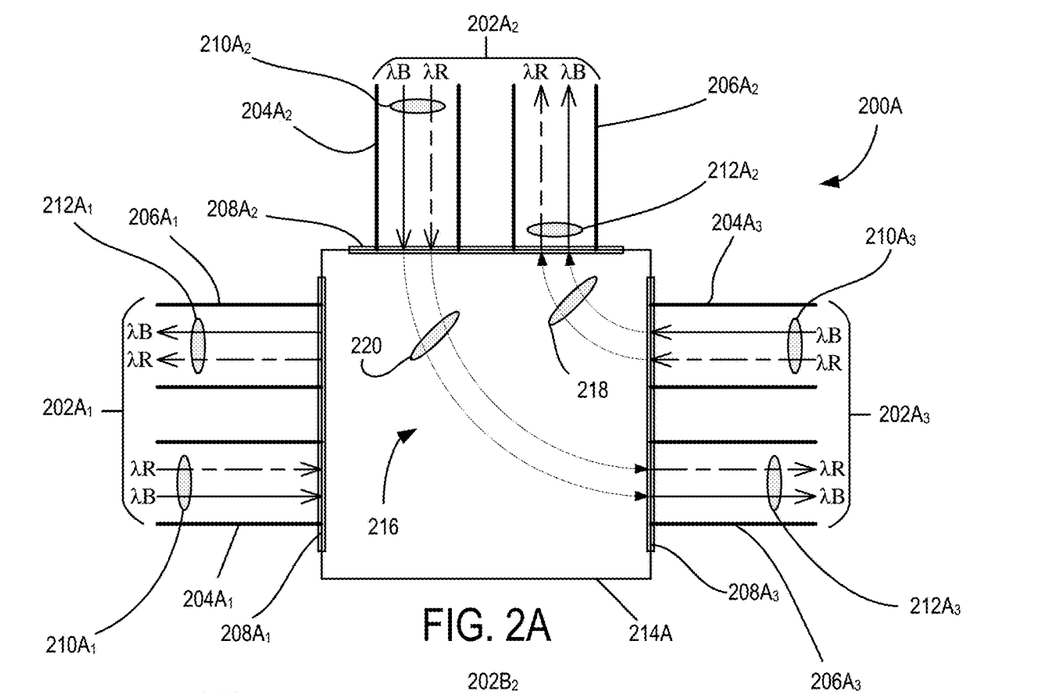
FIGS. 2A-2C illustrate wavelength routing and related wavelength blocking in three-port communication nodes.
Figure 2B:
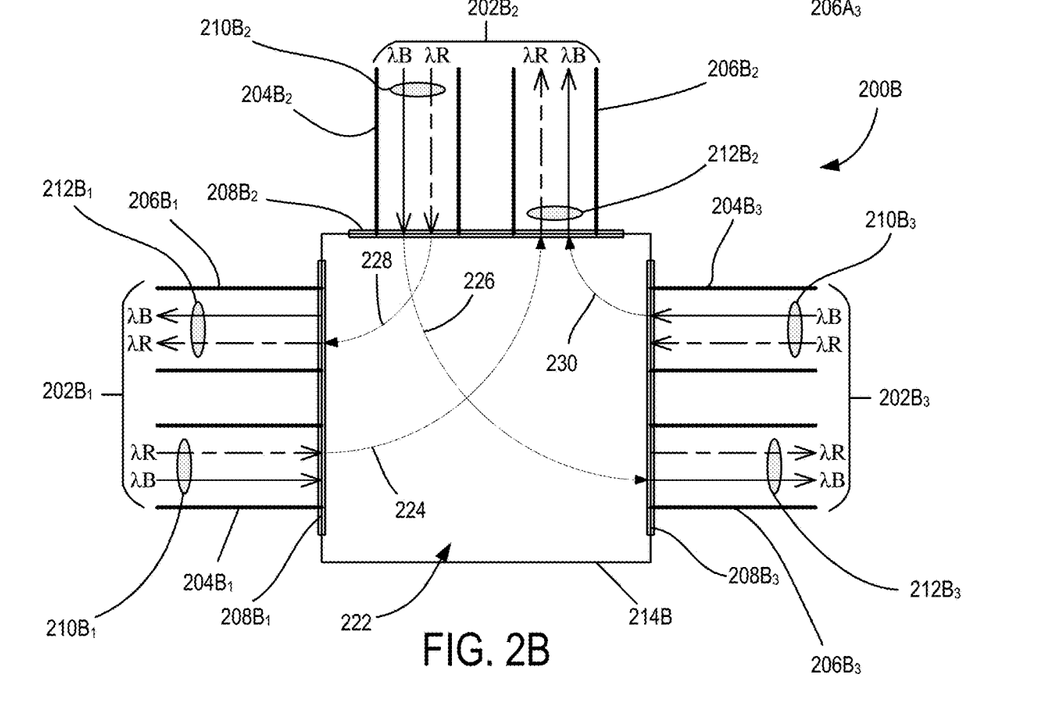
Figure 2C:
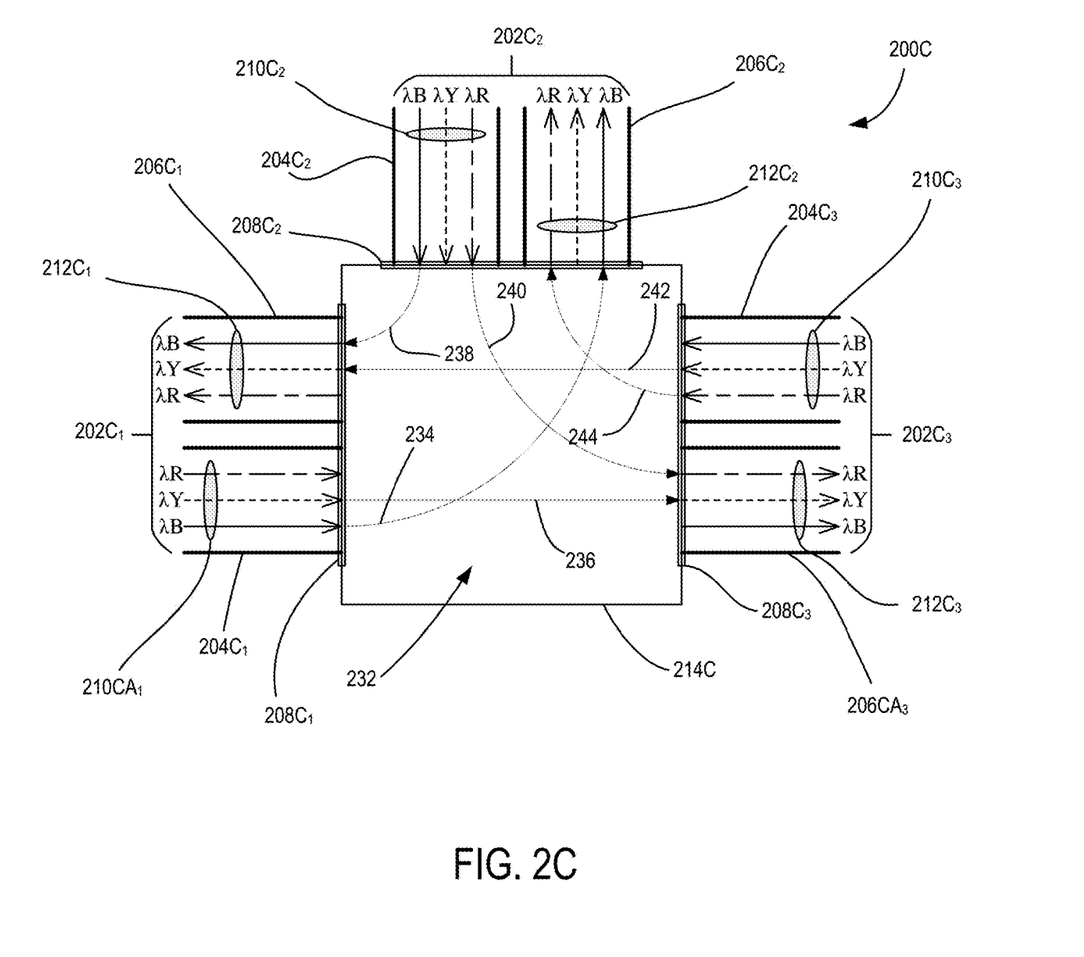

FIGS. 2A-2C show examples of three-port communication nodes 200A-200C each having respective pairs 202A1-202A3, 202B1-202B3, 202C1-202C3 of input optical fibers 204A1-204A3, 204B1-204B3, 204C1-204C3 and output optical fibers 206A1-206A3, 206B1-206B3, 206A1-206A3 coupled to respective ports 208A1-208A3, 208B1-208B3, 208C1-208C3. The input fibers 204A1-204A3, 204B1-204B3, 204C1-204C3 propagate respective input optical signals 210A1-210A3, 210B1-210B3, 210C1-210C3 propagating separate wavelength bands λB, λR, as shown in FIGS. 2A-2B and represented by solid and center-dashed lines, or separate wavelength bands λB, λY, λR, as shown in FIG. 2C and represented by solid, dashed, and center-dashed lines, respectively. The output fibers 206A1-206A3, 206B1-206B3, 206C1-206C3 propagate respective output optical signals 212A1-212A3, 212B1-212B3, 212C1-212C3 propagating separate wavelength bands λB, λR, as shown in FIGS. 2A-2B and represented by solid and center-dashed lines, or separate wavelength bands λB, λY, λR, as shown in FIG. 2C and represented by solid, dashed, and center-dashed lines, respectively.

The three-port communication nodes 200A-200C include respective three-degree reconfigurable optical add-drop multiplexers (ROADMs) 214A-214C that include wavelength selective switches (WSSs) that can route the different wavelengths λB, λR or λB, λY, λR (typically corresponding to disjoint wavelength bands of a few nm to tens of nm wide) of the input optical signals 210A1-210A3, 210B1-210B3, 210C1-210C3 to different ones of the output optical fibers 206A1-206A3, 206B1-206B3, 206A1-206A3. The routing is typically to opposing output optical fibers, but routing back along the respective output fiber paired with the input fiber of the pairs 202A1-202A3, 202B1-202B3, 202C1-202C3 can also be achieved.

As shown in FIG. 2A, the three-degree ROADM 214A of the three-port communication node 200A is routing optical signals in an example of a point-to-point traffic pattern configuration 216. In the point-to-point traffic pattern configuration 216, the λB and λR wavelengths of input optical signal 210A3 are routed as shown with switching paths 218 from input optical fiber 204A3 to output optical fiber 206A2, and the λB and λR wavelengths of input optical signal 210A2 are routed as shown with switching paths 220 from input optical fiber 204A2 to output optical fiber 206A3. However, while the fiber pairs 202A2, 202A3 are fully utilized, the traffic utilization of the fiber pair 202A1 is entirely unutilized, with no available optical fiber of the opposing output optical fibers 206A2, 206A3 to send the input optical signal 210A1 and no available input optical signal from the opposing input optical fibers 204A2, 204A3 to route along the output optical fiber 206A1.

As shown in FIG. 2B, the three-degree ROADM 214B of the three-port communication node 200B is routing optical signals in an example of a hubbed traffic pattern configuration 222. In the hubbed traffic pattern configuration 222, the λR wavelength of the input optical signal 210B1 is routed as shown with switching path 224 from input optical fiber 204B1 to output optical fiber 206B2, the λB and λR wavelengths of input optical signal 210B2 are routed as shown with switching paths 226, 228 from input optical fiber 204B2 to output optical fibers 206B3, 206B1, respectively, and the λB wavelength of the input optical signal 210B3 is routed as shown with switching path 230 from input optical fiber 204B3 to output optical fiber 206B2. However, while the bandwidth of the fiber pair 202B2 is generally fully utilized, the a wavelength of the input optical signal 210B1 cannot be routed to the available λR wavelength signal band of the output optical fiber 206B3, and the λR wavelength of the input optical signal 210B3 cannot be routed to the available λB wavelength signal band of the output optical fiber 206B1, causing wavelength blocking and leaving the fiber pairs 202B1, 202B3 underutilized.

As shown in FIG. 2C, the three-degree ROADM 214C of three-port communication node 200C is routing optical signals in an example of an even mesh traffic pattern configuration 232. In the even mesh traffic pattern configuration 232, the λB and λY wavelengths of input optical signal 210C1 are routed as shown with switching paths 234, 236 from input optical fiber 204C1 to output optical fibers 206C2, 206C3, respectively, the λB and λR wavelengths of input optical signal 210C2 are routed as shown with switching paths 238, 240 from input optical fiber 204C2 to output optical fibers 206C1, 206C3, respectively, and the λY and λR wavelengths of input optical signal 210C3 are routed as shown with switching paths 242, 244 from input optical fiber 204C3 to output optical fibers 206C1, 206C3, respectively. However, due to wavelength blocking, there is no available opposing output optical fiber 206C1-206C3 for the λR wavelength of the input optical signal 210C1, the λY wavelength of the input optical signal 210C2, and the λB wavelength of the input optical signal 210C3, leaving the fiber pairs 202C1-202C3 at most 66% utilized.

Figure 3:
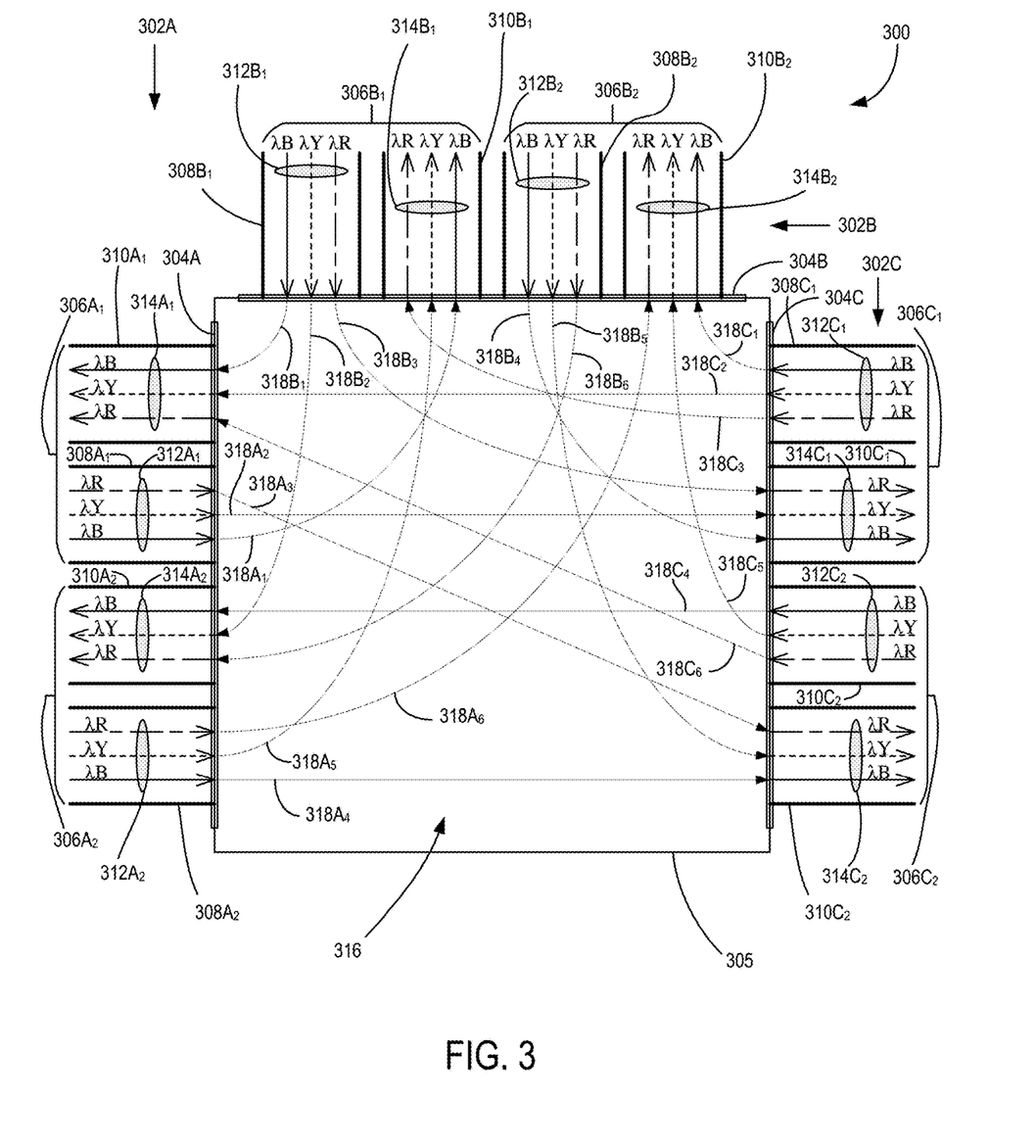
FIG. 3 illustrates a three-port network node that uses a wavelength selective switch-based six-degree reconfigurable optical add-drop multiplexer to reduce wavelength blocking.

FIG. 3 is an example three-port subsea network node 300 that includes three respective communication branches 302A, 302B, 302C and ports 304A, 304B, 304C of a six-degree ROADM 305 that includes wavelength selective switches. Each of the ports 304A-304C respectively receives two optical fiber pairs 306A1-306A2, 306B1-306B2, 306C1-306C2 that include respective input optical fibers 308A1-308A2, 308B1-308B2, 308C1-308C2 and output optical fibers 310A1-310A2, 310B1-310B2, 310C1-310C2. As shown, input optical signals 312A1-312A2, 312B1-312B2, 312C-312C2 are coupled into the respective ports 304A-304C and include data content in different wavelength bands λB, λY, λR (e.g., "blue," "yellow," "red"), represented by solid, dashed, and center-dashed lines, respectively. While three wavelength bands are used, it will be appreciated that additional (or fewer) wavelength channels may be used and switched in typical routing examples. Output optical signals 314A1-314A2, 314B1-314B2, 314C1-314C2 are selectively formed with the wavelength selective switches (e.g., LCoS, MEMS, etc.) of the ROADM 305 in the node 300 with data content in similar wavelength bands λB, λY, λR based on the input optical signals 312A1-312A2, 312B1-312B2, 312C1-312C2 and are coupled out of the respective ports 304A-304C with the respective output optical fibers 310A1-310A2, 310B1-310B2, 310C1-310C2. In some examples, the node 300 can be a terrestrial communication node.

The node 300 provides interconnected routing of the input optical signals 312A1-312A2, 312B1-312B2, 312C-312C2 to form the different output optical signals 314A1-314A2, 314B1-314B2, 314C1-314C2 through wavelength selective switching within a six-degree switching topology rather than two separate three-degree switching topologies. In some six-degree switching topology examples, different wavelengths of a selected input fiber can be routed to different output fibers of an opposing branch. In FIG. 3, the six-degree ROADM 305 is routing optical signals in a selected even mesh traffic pattern configuration 316 based on wavelength selective switching. It will be appreciated that numerous other routing configurations are possible, including hubbed and point-to-point, with various levels of demand. In some examples, wavelength selective switching can provide switching of input signal wavelength channels among any of the output optical fibers 310A1-310A2, 310B1-310B2, 310C1-310C2, and in further examples, reconfigurable wavelength channel selection can be among fewer than any of the output optical fibers, and reconfigurability need not be identical or symmetric with respect to each communication branch 302A-302C.

As shown in FIG. 3 in the even mesh traffic pattern configuration 316, λB, λY, λR wavelengths of input optical signals 312A1-312A2 are routed with respective switching paths 318A1-318A6 from input optical fibers 308A1-308A2 to output optical fibers 310B1, 310B2, 310C1, 310C2. λB, λY, λR wavelengths of input optical signals 312B1-312B2 are routed with respective switching paths 318B1-318B6 from input optical fibers 308B1-308B2 to output optical fibers 310A1, 310A2, 310C1, 310C2. λB, λY, λR wavelengths of input optical signals 312C1-312C2 are routed with respective switching paths 318C1-318C6 from input optical fibers 308C1-308C2 to output optical fibers 310A1, 310A2, 310B1, 310B2. However, with the additional optical fiber pairs 306A2, 306B2, 306C2 provided along the corresponding communication branches 302A-302C and with additional switching options between different output fibers 310A1-310A2, 310B1-310B2, or 310C1-310C2 of a selected corresponding communication branch 302A-302C, the utilization rate of data traffic along the different λB, λY, λR wavelength channels through the node 300 can be increased, and can include up to 100% utilization in some examples with no wavelength-blocking, for the six-degree ROADM 305. Such utilization represents a substantial improvement over the 66% utilization achieved in the even mesh configuration shown in FIG. 2C. In examples shown in FIG. 2C, at best a 66% utilization rate is achievable in point-to-point, hubbed, and evenly meshed configurations. With a three-port node using a 4-degree ROADM, a point-to-point utilization is 50%, a hubbed configuration is 50% or 100%, and an evenly meshed configuration is 75%, corresponding to an average utilization of 64%. With a six-degree ROADM 305, utilization for point-to-point is 66%, hubbed is 66%, and evenly meshed is 100%, corresponding to an average utilization of 77%.

Figure 4:
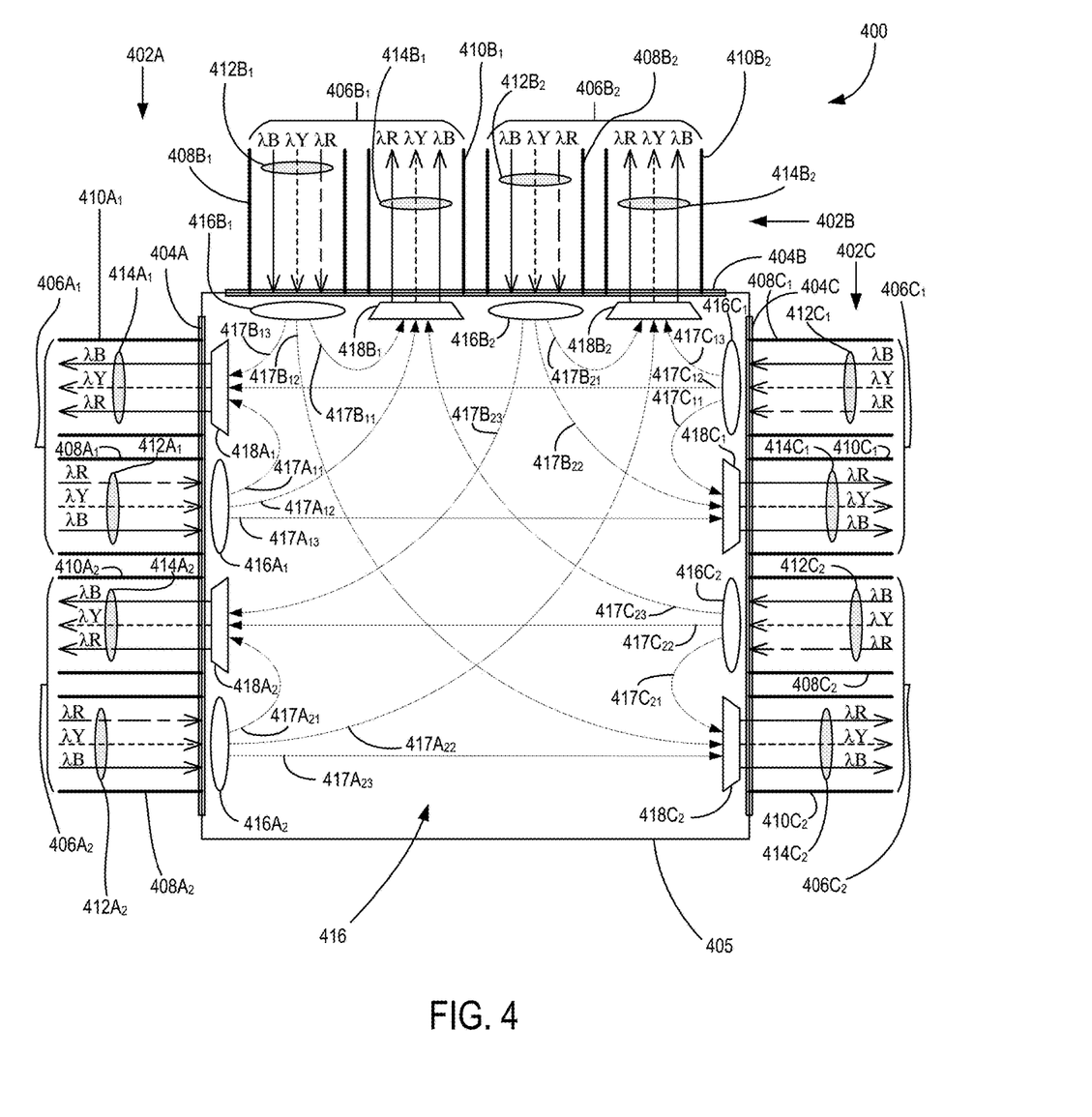
FIG. 4 illustrates a three-port optical communication node using passive optical splitters and wavelength selective switches.

FIG. 4 is a three-port optical communication node 400 that couples three optical fiber communication branches 402A-402C received at ports 404A-404C of a six-degree ROADM 405. In representative examples, the three-port optical communication node 400 is a subsea optical communication node that connects undersea cables corresponding to the communication branches 402A-402C and that can include additional ROADMs, such as additional ones of the six-degree ROADM 405. Optical fiber pairs 406A1-406A2, 406B1-406B2, 406C1-406C2 that include input optical fibers 408A1-408A2, 408B1-408B2, 408C1-408C2 and output optical fibers 410A1-410A2, 410B1-410B2, 410C1-410C2 are respectively coupled to the ports 404A-404C. Input optical signals 412A1-412A2, 412B1-412B2, 412C-412C2 that include data content in different wavelength bands λB, λY, λR represented by solid, dashed, and center-dashed lines, respectively, are coupled into the respective ports 404A-404C. Output optical signals 414A1-414A2, 414B1-414B2, 414C1-414C2 are produced after wavelength selective switching in the node 400 with data content in similar wavelength bands λB, λY, λR based on the input optical signals 412A1-412A2, 412B1-412B2, 412C1-412C2 and are coupled out of the respective ports 404A-404C with the respective output optical fibers 410A1-410A2, 410B1-410B2, 410C1-410C2. The three-port optical communication node 400 includes 1×3 passive optical splitters 416A1-416A2, 416B1-416B2, 416C1-416C2 situated to receive and split the respective input optical signals 412A1-412A2, 412B1-412B2, 412C1-412C2 into a plurality of identical signal copies 417A11-417A13, 417A21-417A23, 417B11-417B13, 417B21-417B23, 417C11-417C13, 417C21-417C23 each typically including all wavelength bands. However, substantial increases in traffic efficiencies and reductions in wavelength blocking can be obtained by coupling the identical signal copies to one output fiber of each of the branches of the three optical fiber communication branches 402A-402C without necessarily directing the identical signal copies to all other output fibers coupled to the six-degree ROADM 405. In general, such splitting and coupling involves interconnecting the different pairs 406A1-406A2, 406B1-406B2, 406C1-406C2 such that one set of three opposing fiber pairs is not switchably isolated or disjoint from the other set of three opposing fiber pairs. For example, fiber pairs 406A1, 406B1, 406C1 are not coupled such that input optical signals 412A1, 412B1, 412C1 become isolated from all of fiber pairs 406A2, 406B2, 406C2. Similarly, fiber pairs 406A1, 406B2, 406C1 are not coupled such that input optical signals 412A1, 412B2, 412C1 become isolated from all of fiber pairs 406A2, 406B1, 406C2. With the three-port configuration of the three-port optical communication node 400 and coupling of an input signal to one output fiber of each opposing branch of the optical fiber communication branches 402A-402C, six opposing fiber mapping assignments are possible with binomial characteristics providing sixty-four (i.e., $2^6$) permutations. Eight permutations can result in the formation of two isolated sets of three fibers, which is typically avoided in representative examples. It will be appreciated that other permutations and arrangements are possible, including with communication nodes having a different number of ports (e.g., 5, 7, etc.). In some examples, additional identical signal copies are produced and coupled to additional selected output optical fibers. In particular examples, identical signal copies are coupled to each respective output optical fiber.

The three-port optical communication node 400 further includes 3×1 wavelength selective switches (WSSs) 418A1-418A2, 418B1-418B2, 418C1-418C2 situated to receive different input signal copies from the passive optical splitters 416A1-416A2, 416B1-416B2, 416C1-416C2. As shown, signal copies 417A11-417A13 of input optical signal 412A1 are coupled to respective WSSs 418A1, 418B1, 418C1, signal copies 417A21-417A23 of input optical signal 412A2 are coupled to respective WSSs 418A2, 418B2, 418C2, signal copies 417B11-417B13 of input optical signal 412B1 are coupled to respective WSSs 418B1, 418C2, 418A1, signal copies 417B21-417B23 of input optical signal 412B2 are coupled to respective WSSs 418B2, 418C1, 418A2, signal copies 417C11-417C13 of input optical signal 412C1 are coupled to respective WSSs 418C1, 418A1, 418C2, and signal copies 417C21-417C23 of input optical signal 412C2 are coupled to respective WSSs 418C2, 418A2, 418B1. The WSSs 418A1-418A2, 418B1-418B2, 418C1-418C2 are configured to select different wavelengths of the received signal copies to form the output optical signals 414A1-414A2, 414B1-414B2, 414C1-414C2 based on traffic demands through the three-port optical communication node 400. For example, the WSS 418A1 can form output optical signal 414A1 to have wavelength λR of input optical signal 412B1 selected from signal copy 417B13, wavelength a of input optical signal 412C1 selected from signal copy 417C12, and wavelength λY of input optical signal 412A1 selected from signal copy 417A11. In another example, the WSS 418A1 can form output optical signal 414A1 to have wavelengths λB, λY, λR of input optical signal 412B1 selected from signal copy 417B13 and none of the wavelengths of input optical signals 412C1, 412A1.

As shown in FIG. 4, signal copies 417A11, 417A21, 417B11, 417B21, 417C11, 417C21 of the input optical signals 412A1, 412A2, 412B1, 412B2, 412C1, 412C2 are selectively return-coupled to respective adjacent output optical fibers 410A1, 410A2, 410B1, 410B2, 410C1, 410C2 of the respective fiber pair 406A1, 406A2, 406B1, 406B2, 406C1, 406C2 with the WSSs 418A1, 418A2, 418B1, 418B2, 418C1, 418C2. In some situations, an uneven traffic demand through the three-port optical communication node 400 can occur, such as where communication between two branches dominates, with the two branches situated opposite a selected branch of the optical fiber communication branches 402A-402C. Subsea optical repeaters that are typically coupled along the selected branch can experience a gain tilt while attempting to operate in a constant output power mode due to an input optical signal along the selected branch becoming stranded at the associated port of the ports 404A-404C. The selective return-coupling can maintain a constant input power through the subsea optical repeaters by directing selected wavelengths of the input optical signal received from the input optical fiber of the selected one of the optical fiber communication branches 402A-402C back along the corresponding output optical fiber of the fiber pair of the selected branch. In selected examples, the WSSs 418A1-418A2, 418B1-418B2, 418C1-418C2 can be configured to equalize wavelength channel powers of the respective output optical signals 414A1-414A2, 414B1-414B2, 414C1-414C2 selectively produced and directed through respective output optical fiber 410A1-410A2, 410B1-410B2, 410C1-410C2, e.g., by selecting or deselecting certain signal or loading tone channels.

Figure 5A:
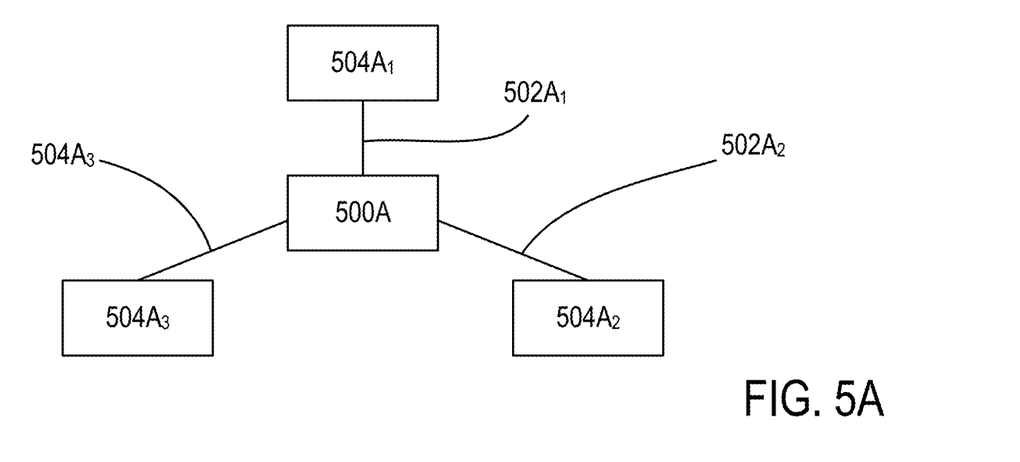
FIGS. 5A-5C illustrate 3-port, 5-port, and 7-port communication nodes.
Figure 5B:
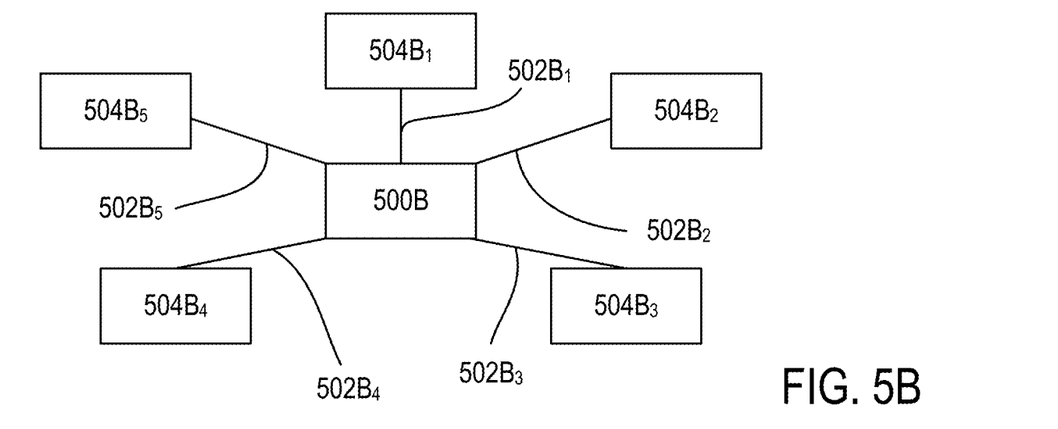
Figure 5C:
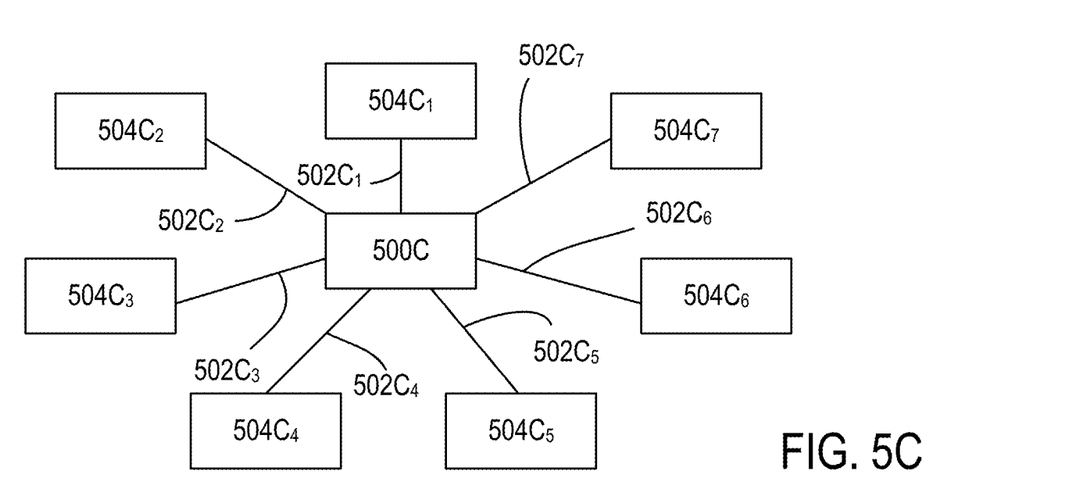

FIGS. 5A-5C depict different communication nodes 500A-500C including respective communication branches 502A1-502A3, 502B1-502B5, 502C1-502C7 coupled to respective distal communication nodes 504A1-504A3, 504B1-504B5, 504C1-504C7, such as signal repeaters, multi-port communication nodes, submarine line terminal equipment (SLTE), etc. The communication branches 502A1-502A3, 502B1-502B5, 502C1-502C7 typically include multiple pairs of transmit/receive optical fibers situated to propagate optical communication traffic from and to the distal communication nodes 504A1-504A3, 504B1-504B5, 504C1-504C7. In the three-port communication node 500A, a six-degree ROADM can be used to direct optical signals among six pairs of transmit/receive optical fibers (e.g., two pairs each) of the three communication branches 502A1-502A3 so that wavelength blocking effects can be reduced for the optical signals. In the five-port communication node 500B, a ten-degree ROADM can be used to direct optical signals among ten pairs of transmit/receive optical fibers (e.g., two pairs each) of the five communication branches 502B1-502B5 so that wavelength blocking effects can be reduced for the optical signals. In the seven-port communication node 500C, a fourteen-degree ROADM can be used to direct optical signals among fourteen pairs of transmit/receive optical fibers (e.g., two pairs each) of the seven communication branches 502A1-502A3 so that wavelength blocking effects can be reduced for the optical signal traffic.

By using a ROADM having a degree that is twice the odd-number of ports of the particular communication node 500A-500C, and providing a second pair of transmit/receive optical fibers for each port, wavelength blocking can be reduced or eliminated (such as in an even mesh traffic pattern). The occurrence of wavelength blocking can be understood by considering a single wavelength on a communication network at a time. In the absence of wavelength conversion, a particular wavelength propagating across the communication network can be considered in isolation. In general, if 100% utilization on the network is not possible throughout the communication network for the particular wavelength, then 100% utilization on the communication network as a whole will not be possible. Thus, with a single wavelength and a channel having two ends, it can be seen that with the odd number of ports associated with the communication nodes 500A-500C, one of the branches will be left unused. Consequently, a maximum average utilization achievable in a star network with a ROADM at the center with N-degrees will be (N−1)/N, regardless of the overall traffic pattern, for odd N, and will be 100% for even N.

Figure 6:
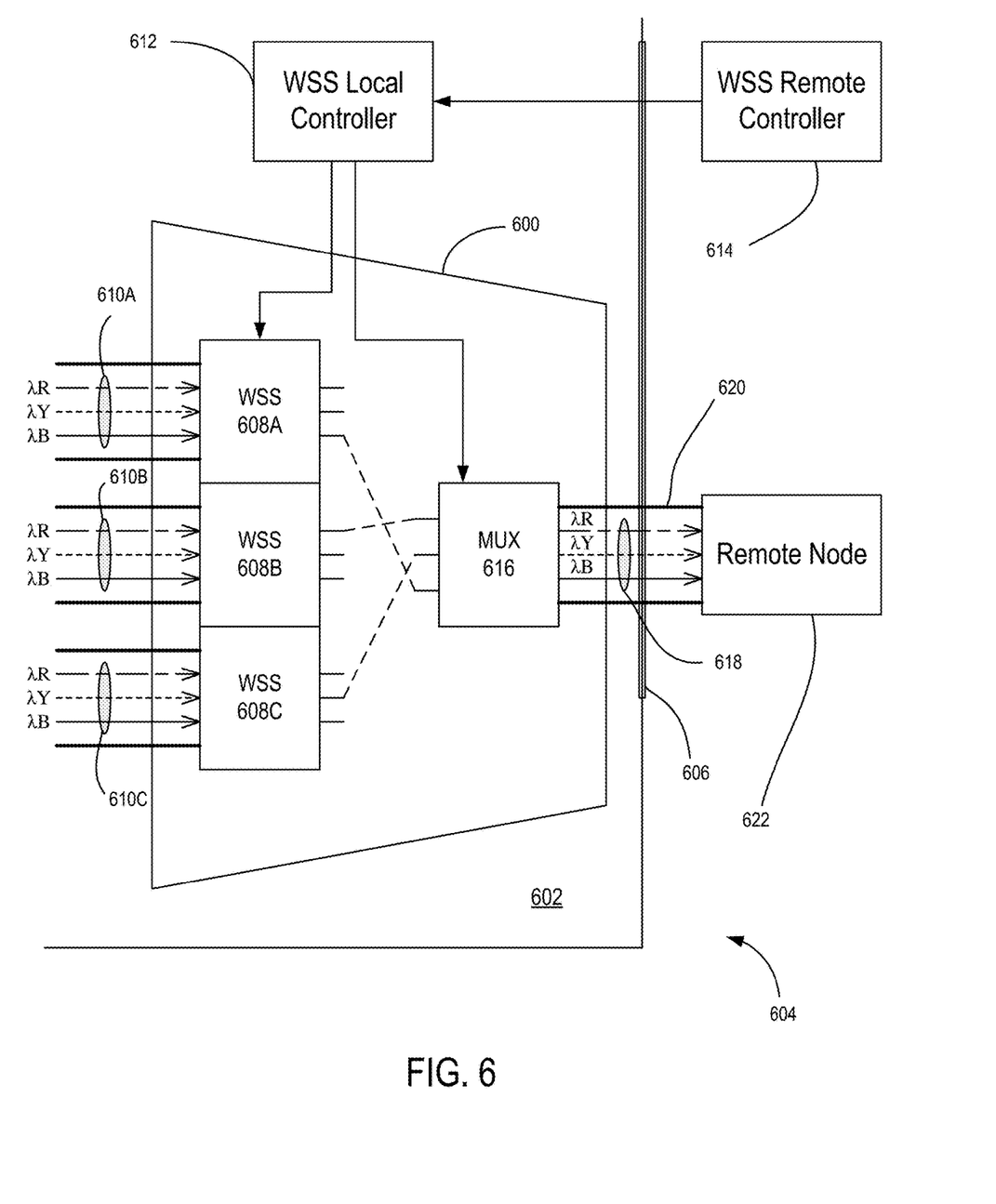
FIG. 6 illustrates a wavelength selective switch of a reconfigurable optical add-drop multiplexer.

FIG. 6 shows an example wavelength selective switch 600 that can be part of a six-degree ROADM 602 of a three-port subsea optical communication node 604, including a port 606. The wavelength selective switch 600 can be LCoS-based, MEMS-based, prism-based, or can use another wavelength selective switching technique as convenient, and includes three wavelength selective subswitches 608A-608C that are respectively coupled to input signals 610A-610C, with the input signals 610A-610C each including a plurality wavelength bands λB, λY, λR While three wavelength bands are shown for convenience of illustration, it will be appreciated that signals can include additional or fewer wavelength bands that can be switched. In representative examples, the input signals 610A-610C correspond to input signals received through the port 606 as well as the two other ports of the three-port subsea optical communication node. A WSS local controller 612 is coupled to the wavelength selective subswitches 608A-608C and is configured to receive instructions from a WSS remote controller 614 (e.g., via a low bit rate communication channel of one of the optical fibers coupled to one or more of the three ports, such as through the port 606) to select different wavelength bands λB, λY, λR of the input signals 610A-610C. As shown, the WSS local controller 612 has commanded the wavelength selective subswitches 608A-608C to select the wavelength band λB of the input signal 610A, the wavelength band λR of the input signal 610B, and the wavelength band kY of the input signal 610C. The remaining wavelengths bands of the input signals 610A-610C are blocked, and the selected signal wavelength bands are received by a wavelength multiplexer 616. The wavelength multiplexer 616 combines the selected signal wavelength bands to form an output signal 618 that is coupled out of the three-port subsea optical communication node 604 with a subsea optical cable 620 through the port 606. The output signal 618 typically propagates a substantial distance along the seafloor to a remote communication node 622. In some examples, the wavelength selective switch 600 can include additional wavelength selective subswitches to select among wavelengths of other input signals coupled to the three-port subsea optical communication node 604.

Figure 7:
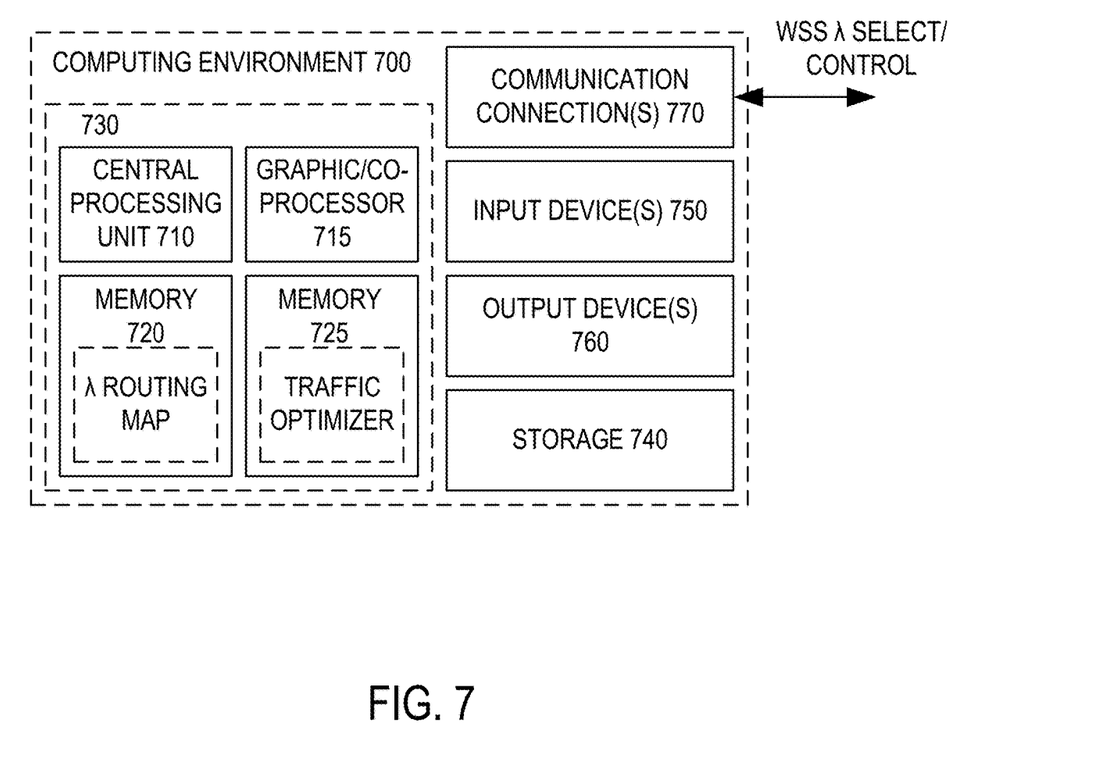
FIG. 7 illustrates an example computing environment used for wavelength switching.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In representative examples, the communication connection(s) 770 can enable communication with remote communication nodes, such as data network nodes, optical communication nodes, subsea optical communication nodes, submarine line terminal equipment, multi-port nodes, etc.

As shown in FIG. 7, a wavelength routing map and other wavelength routing settings for multi-channel communications are stored in the memory 720. Computer-executable instructions for controlling remote ROADMs and WSSs to route wavelength channels to different output fibers or communication branches are sorted in the memory 725. Either can be stored in the storage 740 or provided via a remote location, and local storage is not required.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 8:
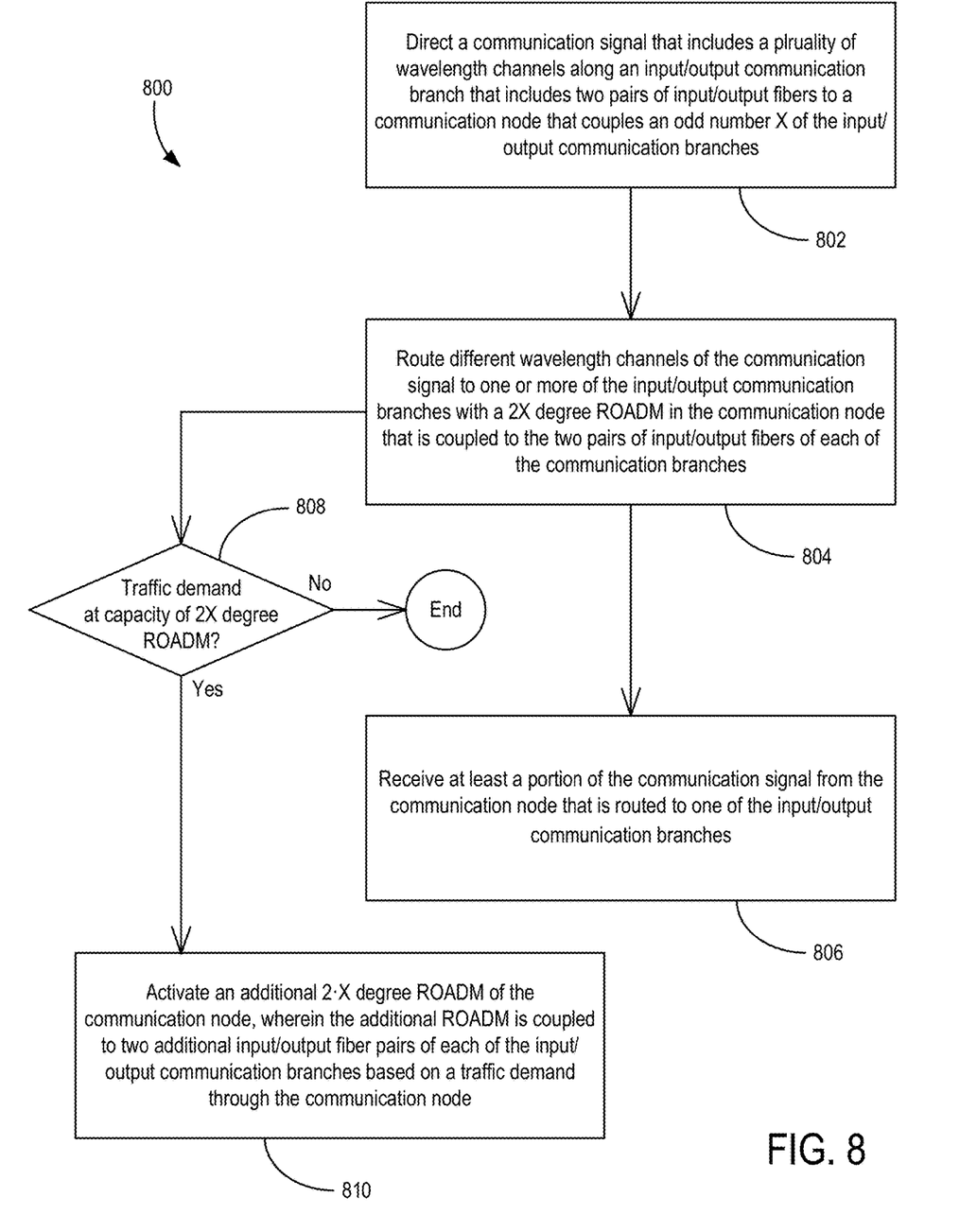
FIG. 8 is a flowchart illustrating example methods.

FIG. 8 shows a method example 800 of communication with a communication node. At 802, a communication signal that includes a plurality of wavelength channels is directed along an output fiber of two pairs of input/output fibers of a communication branch of a communication network, such as a subsea communication network, to a communication node that couples an odd number X of input/output communication branches with each communication branch also including two pairs of input/output fibers. At 804, the communication signal is routed at the communication node to one or more of the communication branches (possibly including the communication branch delivering the communication signal) with a 2X degree ROADM that is situated in the communication node and that is coupled to the two pairs of input/output fibers of each of the communication branches. At 806, at least a portion of the communication signal routed to one of the communication branches in the communication node is received from the communication node at another location along the corresponding communication branch, such as at a remote node. At 808, a traffic demand through the communication node can be detected and analyzed for reaching capacity or another node traffic utilization threshold, and if achieved, at 810, an additional 2X degree ROADM can be activated that is coupled to two additional input/output fibers of each of the input/output communication branches at the communication node.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. An apparatus, comprising:
a node situated to receive an odd-number X of input/output communication branches extending from respective ports, each communication branch including two input/output fiber pairs; and
a 2·X degree ROADM coupled to the two input/output fiber pairs of each of the X ports;
wherein the ROADM includes a plurality of wavelength selective switches configured to selectively route a wavelength channel of an input signal received from an input fiber of one of the input/output fiber pairs to a wavelength channel of an output signal transmitted along an output fiber of one of the input/output fiber pairs;
wherein the ROADM includes a plurality of optical splitters respectively coupled to each of the input fibers of the input/output fiber pairs and situated to produce copies of the input signal received from the corresponding input fiber;
wherein each optical splitter is a passive optical splitter situated to direct the input signal received along a respective input fiber of one of the input/output fiber pairs to the wavelength selective switch coupled to the output fiber of the one input/output fiber pair, and to a selected one of the plurality of wavelength selective switches coupled to one of the output fibers of the two input/output fiber pairs of each of the communication branches opposite the communication branch receiving the input signal.

2. The apparatus of claim 1, further comprising one or more additional ROADMs, each having a degree corresponding to twice the odd-number of ports and each coupled to two additional input/output fiber pairs of each of the input/output communication branches through the respective ports.

3. The apparatus of claim 1, wherein the node includes a node controller coupled to the ROADM and that is configured to control the wavelength switching selection provided by the wavelength selective switches.

4. The apparatus of claim 1, wherein the node is coupled to a remote node controller through one of the input/output communication branches and the remote node controller is configured to control the wavelength switching selection provided by the wavelength selective switches.

5. The apparatus of claim 1, wherein at least one of the wavelength selective switches is configured to select one or more wavelength channels from each of at least two of the input signals received by the at least one wavelength selective switch and to multiplex the selected wavelength channels to form the output signal.

6. The apparatus of claim 1, wherein the directing of the input signals between input/output fiber pairs produces an interconnection of the input/output fiber pairs corresponding to a non-disjoint mapping of two sets of the input/output fiber pairs with each set including one of the input/output fiber pairs of each communication branch.

7. The apparatus of claim 1, wherein X is three and the ROADM is a six-degree ROADM.

8. The apparatus of claim 1, wherein the input/output communication branches comprise subsea optical cables that include a plurality of optical fiber transmit/receive pairs that include the input/output fiber pairs.

9. The apparatus of claim 8, wherein the node is a subsea optical.

10. The apparatus of claim 1, wherein the 2·X degree ROADM is configured to reduce a wavelength blocking of traffic through the node, wherein the wavelength blocking is associated with the fact that X is an odd number.

11. The apparatus of claim 10, wherein the reduction of wavelength blocking corresponds to a 100% traffic utilization rate during an even-mesh traffic pattern through the node.

* * * * *